United States Patent
Schaupmann et al.

(10) Patent No.: US 11,026,273 B2
(45) Date of Patent: Jun. 1, 2021

(54) MOBILE SATELLITE COMMUNICATION GATEWAY AND METHOD FOR ESTABLISHING A SATELLITE COMMUNICATION CONNECTION

(71) Applicant: AIRBUS OPERATIONS GMBH, Hamburg (DE)

(72) Inventors: Christian Schaupmann, Hamburg (DE); Johannes Hertel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/803,026

(22) Filed: Feb. 27, 2020

(65) Prior Publication Data
US 2020/0281028 A1    Sep. 3, 2020

(30) Foreign Application Priority Data
Feb. 28, 2019    (DE) ............ 10 2019 202 685.0

(51) Int. Cl.
*H04W 76/10*    (2018.01)
*H04B 7/185*    (2006.01)
*H04B 7/195*    (2006.01)
*H04W 84/12*    (2009.01)
*H04W 88/16*    (2009.01)

(52) U.S. Cl.
CPC ........ *H04W 76/10* (2018.02); *H04B 7/18506* (2013.01); *H04B 7/195* (2013.01); *H04W 84/12* (2013.01); *H04W 88/16* (2013.01)

(58) Field of Classification Search
CPC ...... H04B 7/185–18571; H04W 76/10; H04W 84/12; H04W 88/16
See application file for complete search history.

(56) References Cited

U.S. PATENT DOCUMENTS

| | | | |
|---|---|---|---|
| 6,105,060 A | 8/2000 | Rothblatt | |
| 6,384,783 B1 * | 5/2002 | Smith | G01S 5/0081 342/387 |
| 7,599,691 B1 * | 10/2009 | Mitchell | G06Q 30/02 455/431 |
| 8,966,260 B1 * | 2/2015 | Walter | H04L 63/0263 713/168 |

(Continued)

OTHER PUBLICATIONS

German Search Report for Application No. 10 2019 202 685.0 dated Oct. 29, 2019.

*Primary Examiner* — Raymond S Dean
(74) *Attorney, Agent, or Firm* — Jenkins, Wilson, Taylor & Hunt, P.A.

(57) ABSTRACT

A mobile satellite communication gateway includes an aircraft communication interface and a satellite communication interface. The aircraft communication interface is designed to make a bidirectional data connection between the satellite communication gateway and a data network of an aircraft, while the satellite communication interface is designed to make a bidirectional data connection between the satellite communication gateway and a satellite communication network. The satellite communication gateway includes a signal processing device, which is coupled to the aircraft communication interface and the satellite communication interface and which is designed to interchange data between the data network of the aircraft and the satellite communication network.

9 Claims, 1 Drawing Sheet

(56) References Cited

U.S. PATENT DOCUMENTS

| | | | |
|---|---|---|---|
| 9,553,658 B1 | 1/2017 | Bantoft et al. | |
| 2003/0130769 A1 | 7/2003 | Farley et al. | |
| 2004/0139467 A1 | 7/2004 | Rogerson et al. | |
| 2007/0243822 A1* | 10/2007 | Monte | H04J 3/10 |
| | | | 455/12.1 |
| 2008/0233953 A1 | 9/2008 | Stefani et al. | |
| 2009/0309801 A1* | 12/2009 | Rao | H01Q 1/288 |
| | | | 343/779 |
| 2017/0144773 A1* | 5/2017 | Raman | B64D 45/00 |
| 2018/0219943 A1* | 8/2018 | Gummig | H04L 65/4084 |

* cited by examiner

MOBILE SATELLITE COMMUNICATION GATEWAY AND METHOD FOR ESTABLISHING A SATELLITE COMMUNICATION CONNECTION

CROSS-REFERENCE TO RELATED APPLICATION

This application claims priority to German Patent Application No. 10 2019 202 685.0 filed Feb. 28, 2019, the entire disclosure of which is incorporated by reference herein.

TECHNICAL FIELD

The disclosure herein relates to a mobile satellite communication gateway and to a method for establishing a satellite communication connection, in particular for the satellite communication of an aircraft on the ground.

BACKGROUND

Geostationary communication satellites are used as broadband repeaters orbiting the Earth for data communication. Signals from ground stations are received by the satellites, modulated and returned to an Earth-based communication receiver. In the case of bidirectional services, communication is accordingly also effected in the opposite direction. Geostationary communication satellites travel on geosynchronous orbits, so that they can easily—because they are fixed in position—be used for a communication connection at any time. This arrangement covers polar regions only inadequately, however.

Global communication satellite systems on low earth orbit (LEO), such as for example Iridium or, soon, Oneweb, allow efficient global data communication at competitive prices and at high data rates. The completely global and high level of service makes LEO satellite constellations highly appealing for aviation.

Document U.S. Pat. No. 6,105,060 A discloses a system for providing global internet access by LEO satellites. The document U.S. Pat. No. 9,553,658 B1 discloses Satcom Direct Routers for managing cabin communication systems aboard the aircraft.

There is therefore a fundamental need for solutions for improved connectivity of data networks in aircraft with communication satellite systems, in particular in the case of aircraft that are on the ground, for example at the airport or undergoing servicing.

SUMMARY

One of the objects of the disclosure herein is therefore to find improved solutions for establishing satellite communication connections to an aircraft.

This and other objects are achieved by a mobile satellite communication gateway having features disclosed herein and by a method for establishing a satellite communication connection having features disclosed herein.

In accordance with a first aspect of the disclosure herein, a mobile satellite communication gateway comprises an aircraft communication interface and a satellite communication interface. The aircraft communication interface is designed, or configured, to make a bidirectional data connection between the satellite communication gateway and a data network of an aircraft, while the satellite communication interface is designed to make a bidirectional data connection between the satellite communication gateway and a satellite communication network. The satellite communication gateway moreover comprises a signal processing device, which is coupled to the aircraft communication interface and the satellite communication interface and which is designed to interchange data between the data network of the aircraft and the satellite communication network.

In accordance with a second aspect of the disclosure herein, a method for establishing a satellite communication connection comprises the steps of setting up a first data communication connection between a data network of the aircraft and an aircraft communication interface of a mobile satellite communication gateway and setting up a second data communication connection between the satellite communication network and a satellite communication interface of the mobile satellite communication gateway. The first and second data communication connections are then used to interchange data between the data network of the aircraft and the satellite communication network.

A fundamental concept of the disclosure herein is to provide an external device next to an aircraft that can connect to a satellite communication network. An applicable aircraft interface of this external device can then be used by the aircraft to set up a satellite communication connection. Advantageously, there is no need in this case to be reliant on other communication connections, such as for example mobile radio. This means that, in particular in situations in which the aircraft could not set up a data connection to global data networks on account of a lack of coverage or in the absence of connection to local area networks using conventional means available in the aircraft, a satellite communication connection can be established at any time.

The satellite communication connection allows aircraft-relevant data to be forwarded to a customer, an airline, a servicing team or an official organization at any time during servicing or while on the ground at an airport, and accordingly allows data to be received from these network subscribers.

Advantageous configurations and developments emerge from the description with reference to the figures.

In accordance with some embodiments of the satellite communication gateway according to the disclosure herein, the satellite communication gateway can furthermore have a memory device, which is coupled to the signal processing device and which is designed to store authentication and identification data of a multiplicity of aircraft for a multiplicity of satellite communication networks.

In accordance with some further embodiments of the satellite communication gateway according to the disclosure herein, the satellite communication gateway can furthermore have a peripheral device interface, which is designed to make a data connection between the satellite communication gateway and a multiplicity of peripheral devices. The peripheral devices in this case can comprise sensors or cameras, for example.

In accordance with some further embodiments of the satellite communication gateway according to the disclosure herein, the aircraft communication interface can be a wireless or a wired communication interface.

In accordance with some further embodiments of the satellite communication gateway according to the disclosure herein, the signal processing device can have a wireless communication module by which a local wireless communication connection to the signal processing device can be set up.

In accordance with some further embodiments of the satellite communication gateway according to the disclosure herein, the satellite communication interface can support communication in the Ku band, in the Ka band and in the L band.

In accordance with some further embodiments of the satellite communication gateway according to the disclosure herein, the signal processing device can be designed to set up end-to-end encryption between the aircraft communication interface and the satellite communication interface.

In accordance with some further embodiments of the satellite communication gateway according to the disclosure herein, the satellite communication gateway can be designed to automatically determine an instantaneous global position, for example using an integrated GPS module.

The above configurations and developments can be combined with one another as desired, where appropriate. Further possible configurations, developments and implementations of the disclosure herein also encompass combinations not explicitly mentioned of features of the disclosure herein that are described above or below in respect of the exemplary embodiments. In particular, a person skilled in the art will also add individual aspects as improvements or supplementations to the respective basic form of the disclosure herein.

BRIEF DESCRIPTION OF THE DRAWINGS

The disclosure herein is explained in more detail below on the basis of the example embodiments indicated in the schematic figures, in which.

Figure 1:
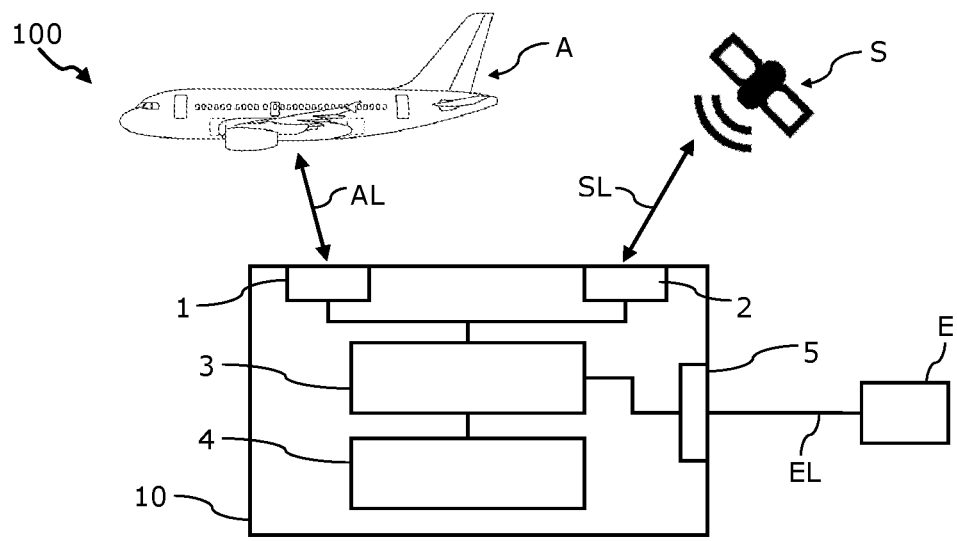
FIG. 1 shows a schematic block diagram of a network environment of an aircraft in accordance with an embodiment of the disclosure herein.

The accompanying figures are intended to convey a further understanding of the embodiments of the disclosure herein. They illustrate embodiments and, in association with the description, serve to elucidate principles and concepts of the disclosure herein. Other embodiments and many of the advantages mentioned are evident in view of the drawings. The elements of the drawings are not necessarily shown in a manner true to scale with respect to one another. Direction-indicating terminology such as, for instance, "at the top", "at the bottom", "left", "right", "above", "below", "horizontal", "vertical", "at the front", "at the back" and similar indications are used only for explanatory purposes and do not serve to restrict the generality to specific configurations as shown in the figures.

In the figures of the drawing, identical, functionally identical and identically acting elements, features and components—unless explained otherwise—are provided in each case with the same reference signs.

DETAILED DESCRIPTION

FIG. 1 shows a schematic block diagram of a network environment 100 of an aircraft A. The aircraft A can be connected to a satellite communication network S for data communication purposes via data communication connections AL and SL. This connection for data communication purposes is conveyed by a mobile satellite communication gateway 10.

The mobile satellite communication gateway 10 comprises an aircraft communication interface 1 and a satellite communication interface 2. The aircraft communication interface 1 and the satellite communication interface 2 are coupled to one another via a signal processing device 3. The aircraft communication interface 1, which can be a wireless or a wired communication interface, can be used by the satellite communication gateway 10 to make a bidirectional data connection AL between the satellite communication gateway 10 and a data network of an aircraft A. The satellite communication interface 2 can be used by the satellite communication gateway 10 to make a bidirectional data connection SL between the satellite communication gateway 10 and a satellite communication network S. The satellite communication interface 2 can, to this end, support communication in the Ku band, in the Ka band and/or in the L band.

Following setup of the two data connections AL and SL, the signal processing device 3 can interchange data between the data network of the aircraft A and the satellite communication network S.

The satellite communication gateway 10 can moreover have a memory device 4, such as for example a hard disk, a ROM memory or a RAM memory, which is coupled to the signal processing device 3 and which is designed to store authentication and identification data of a multiplicity of aircraft A for a multiplicity of satellite communication networks S. A peripheral device interface 5 can be used to optionally make data connections EL between the signal processing device 3 of the satellite communication gateway 10 and a multiplicity of peripheral devices E, such as for example temperature sensors, monitoring cameras, motion sensors or the like.

The signal processing device 3 can moreover have a wireless communication module by which a local wireless communication connection to the signal processing device 3 can be set up, for example in order to be able to produce a user interface with computers of a servicing team by WLAN for servicing work. Furthermore, the signal processing device 3 can use appropriate encryption technology in order to be able to set up end-to-end encryption between the aircraft communication interface 1 and the satellite communication interface 2.

The satellite communication gateway 10 can moreover use the satellite communication connection to automatically determine an instantaneous global position. Alternatively or additionally, the satellite communication gateway 10 can have an integrated GPS module.

Figure 2:
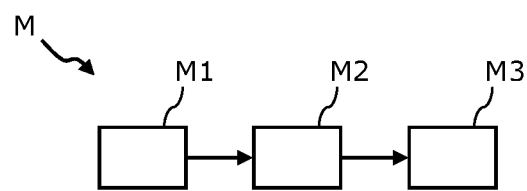
FIG. 2 shows a schematic flowchart for a method for establishing a satellite communication connection between an aircraft and a satellite communication network in accordance with a further embodiment of the disclosure herein.

FIG. 2 shows an exemplary method M for establishing a satellite communication connection between an aircraft A and a satellite communication network S, as depicted in FIG. 1, for example. The method M in this case can make use of a mobile satellite communication gateway, for example, such as the mobile satellite communication gateway 10 illustrated in exemplary fashion in FIG. 1, for example.

In a first step M1, the method M comprises setting up a first data communication connection AL between a data network of the aircraft A and an aircraft communication interface 1 of a mobile satellite communication gateway 10. In a second step M2, the method comprises setting up a second data communication connection SL between the satellite communication network S and a satellite communication interface 2 of the mobile satellite communication gateway 10. After that, in a step M3, data can be interchanged between the data network of the aircraft A and the satellite communication network S via the first and second data communication connections.

The mobile satellite communication gateway 10 can advantageously use authentication measures to increase network security. Appropriate communication protocols for data interchange between aircraft A and ground stations can be implemented and supported in the mobile satellite communication gateway 10. To this end, the mobile satellite communication gateway 10 can set up VPN tunnels to an operator company, for example. Similarly, modern encryption protocols can be implemented, and data compression, data reduction and/or data filtering algorithms can be performed by the signal processing device 3.

A satellite communication connection can be set up automatically, since appropriate connection parameters such as for example passwords, access codes, access keys or physical connection information such as a list of usable satellites, the orbital position thereof, frequencies or coding data can be kept in the memory device 4.

In the detailed description above, various features have been combined in one or more examples in order to improve the rigorousness of the illustration. It should be clear here, however, that the above description is of merely illustrative, but in no way restrictive, nature. It serves to cover all alternatives, modifications and equivalents of the various features and exemplary embodiments. Many other examples will be immediately and directly clear to a person skilled in the art on the basis of the latter's technical knowledge in view of the above description.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

The exemplary embodiments have been chosen and described in order to be able to present the principles underlying the disclosure herein and their application possibilities in practice in the best possible way. As a result, those skilled in the art can optimally modify and utilize the disclosure herein and its various exemplary embodiments with regard to the intended purpose of use. In the claims and the description, the terms "including" and "having" are used as neutral linguistic concepts for the corresponding terms "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile satellite communication gateway, comprising:
an aircraft communication interface, which is configured to make a bidirectional data connection between the satellite communication gateway and a data network of an aircraft;
a satellite communication interface, which is configured to make a bidirectional data connection between the satellite communication gateway and a satellite communication network;
a signal processing device, which is coupled to the aircraft communication interface and the satellite communication interface and which is configured to interchange data between the data network of the aircraft and the satellite communication network; and
a memory device coupled to the signal processing device, the memory device being configured to store connection parameters, the connection parameters including passwords, access codes, access keys and physical connection information, the physical connection information including lists of usable satellites, orbital positions of the usable satellites, frequencies, and coding data of a multiplicity of aircraft for a multiplicity of satellite communication networks.

2. The satellite communication gateway according to claim 1, further comprising a peripheral device interface, which is configured to make a data connection between the satellite communication gateway and a multiplicity of peripheral devices.

3. The satellite communication gateway according to claim 2, wherein the peripheral devices comprise sensors or cameras.

4. The satellite communication gateway according to claim 1, wherein the aircraft communication interface is a wireless or wired communication interface.

5. The satellite communication gateway according to claim 1, wherein the signal processing device has a wireless communication module by which a local wireless communication connection to the signal processing device can be set up.

6. The satellite communication gateway according to claim 1, wherein the satellite communication interface supports communication in the Ku band, in the Ka band and in the L band.

7. The satellite communication gateway according to claim 1, wherein the signal processing device is configured to set up end-to-end encryption between the aircraft communication interface and the satellite communication interface.

8. The satellite communication gateway according to claim 1, wherein the satellite communication gateway is configured to automatically determine an instantaneous global position.

9. A method for establishing a satellite communication connection between an aircraft and a satellite communication network, the method comprising:
setting up a first data communication connection between a data network of the aircraft and an aircraft communication interface of a mobile satellite communication gateway;
setting up a second data communication connection between the satellite communication network and a satellite communication interface of the mobile satellite communication gateway;

interchanging data between the data network of the aircraft and the satellite communication network using a signal processing device, the signal processing device being coupled to the aircraft communication interface and the satellite communication interface, through the first and second data communication connections; and providing a memory device coupled to the signal processing device, the memory device being configured to store connection parameters, the connection parameters including passwords, access codes, access keys and physical connection information, the physical connection information including lists of usable satellites, orbital positions of the usable satellites, frequencies, and coding data of a multiplicity of aircraft for a multiplicity of satellite communication networks.

\* \* \* \* \*